United States Patent [19]

Hart

[11] Patent Number: 5,250,174

[45] Date of Patent: Oct. 5, 1993

[54] METHOD OF BREAKING WATER-IN-OIL EMULSIONS BY USING QUATERNARY ALKYL AMINE ETHOXYLATES

[75] Inventor: Paul R. Hart, The Woodlands, Tex.

[73] Assignee: Betz Laboratories, Inc., Trevose, Pa.

[21] Appl. No.: 884,670

[22] Filed: May 18, 1992

[51] Int. Cl.$^5$ .................. C10G 33/04; B01D 17/05
[52] U.S. Cl. ................................ 208/188; 252/344; 252/358
[58] Field of Search ............... 208/188; 252/344, 358

[56] References Cited

U.S. PATENT DOCUMENTS 3,169,118  2/1965  Kirkpatrick et al. .............. 252/341
3,205,169  9/1965  Kirkpatrick et al. .............. 252/344
3,974,220  8/1976  Heib et al. ........................ 252/344

FOREIGN PATENT DOCUMENTS 268580  7/1970  U.S.S.R. ........................... 208/188

Primary Examiner—Theodore Morris
Assistant Examiner—Walter D. Griffin
Attorney, Agent, or Firm—Alexander D. Ricci; Gregory M. Hill

[57] ABSTRACT

A method of breaking a water-in-oil emulsion in a hydrocarbon liquid comprising adding to the hydrocarbon a sufficient amount of a quaternary alkyl amine ethoxylate.

10 Claims, 1 Drawing Sheet

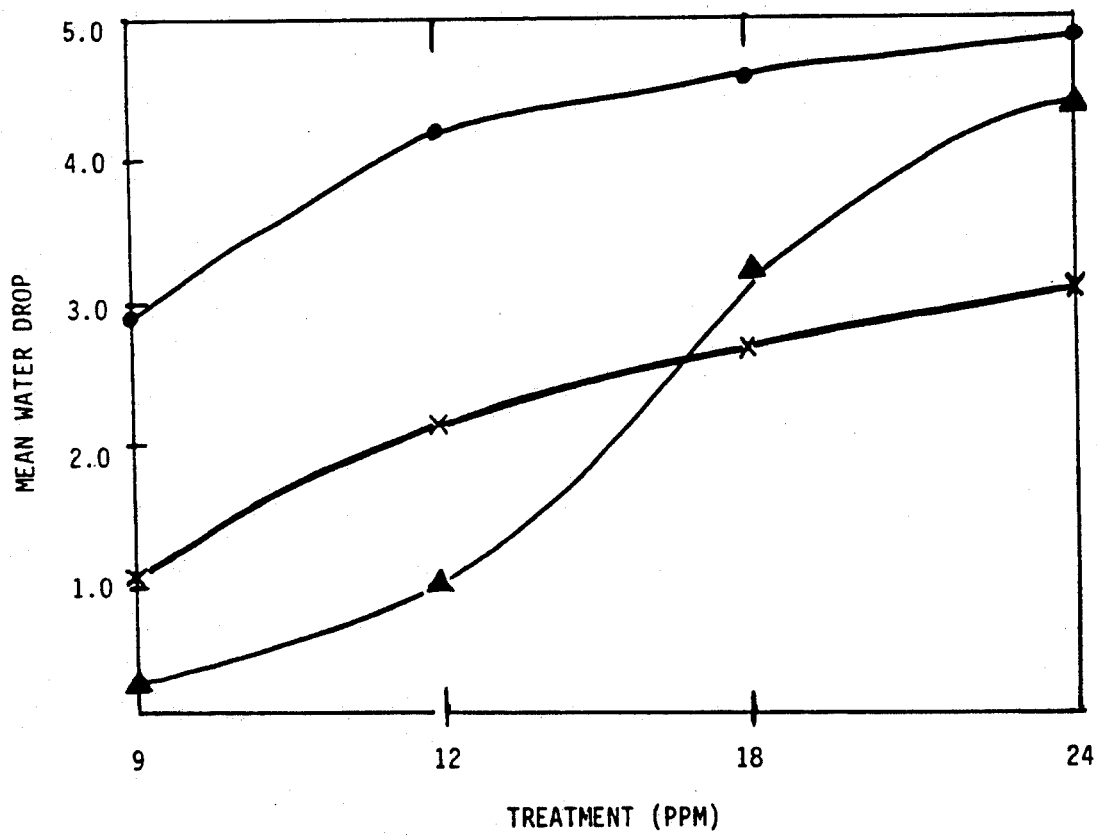

METHOD OF BREAKING WATER-IN-OIL EMULSIONS BY USING QUATERNARY ALKYL AMINE ETHOXYLATES

FIELD OF THE INVENTION

The present invention relates to the process of breaking water-in-oil emulsions. Specifically, it deals with an improved process for the separation of water emulsified within numerous hydrocarbon liquids.

BACKGROUND OF THE INVENTION

In the manufacture, handling, transportation and/or use of various organic substances, corrosion problems occur due to the presence of varying amounts of water in solution or in suspension in the organic substances. Illustrative organic substances include particularly hydrocarbon distillates as gasoline, jet fuel, kerosene, lubricating oil, fuel oil, diesel oil, crude oil, etc. Other specific oils include cutting oils, soluble oils, slushing oils, rolling oils, etc. which may be of mineral, animal or vegetable origin. Other organic substances include various coating compositions as grease, wax, household oil, paints lacquer, etc. Still other organic substances include alcohols ketones, esters, ethers, dioxane, amino compounds, amides etc. In spite of all reasonable and practical precautions which are taken to avoid the presence of water, an appreciable quantity of water separation is found as a film or in minute droplets in the pipe line or on container walls or even in small pools at the bottom of the container. This results in corrosion of the metal surfaces and contamination of the organic substance by the corrosion products.

In order to prevent or at least inhibit the corrosion caused by salts and other contaminants entrained within the water phase, it is desirable to remove the water from the continuous phase hydrocarbon liquid. The water must be separated into a distinct layer so that it can be siphoned away from the hydrocarbon liquid. Before this can occur, however, the emulsion must first be broken.

It is an object of this invention to provide a highly efficient method for the breaking of the water-in-oil emulsion. This ultimately results in a reduction in the corrosion of the metallic parts which contact with the hydrocarbon liquid.

BRIEF DESCRIPTION OF THE DRAWING

FIG. 1 is a graph showing the demulsifies dose response.

DETAILED DESCRIPTION OF THE INVENTION

The present invention achieves the objective of breaking a water-in-oil emulsion by the use of quaternary alkyl amine ethoxylates. Those compounds contemplated as falling within the boundaries of this invention are defined as being methyl quaternary amines having the structure: $RN[(EO)_xH]_2 CH_3$, ethoxyl quaternary amines having the structure: $RN(EOH)_3$ or $RN(EOH)_2(CH_2)_3N(EOH)_3$, or quaternary amine oxides having the structure: $RN(EOH)_2O$, wherein EO is ethylene oxide and x is such that the EO content is 30-70% by weight and R is an alkyl group of $C_{12}$-$C_{18}$. Preferably, these are blended, if necessary, to achieve an overall EO content of 50-65% by weight. The individual quaternary alkyl amine ethoxylates have the following EO contents: methyl quaternary amines (50-70%), ethoxyl quaternary amines (30-50%) and quaternary amine oxides (20-30%).

The quaternary alkyl amine ethoxylates of the present invention may be added to the hydrocarbon liquid at any convenient location during processing, transport or storage where it is desirable to remove emulsified water. Systems for the processing of gas oils or crude oils benefit from the practice of the present invention. The above compounds are especially useful at the desalter in a refinery which processes crude oil.

The amount of quaternary alkyl amine ethoxylate required to be added to the hydrocarbon liquid should be that amount necessary to break the oil in water emulsion. Generally, about 1 to 100 ppm, by volume, will be sufficient.

EXAMPLES

The following examples are intended to show the efficacy of the present invention as an emulsion breaker. They are not intended to limit the scope to the specific substrate environment tested.

Twelve separate test tubes were prepared to contain a 10% water-in-oil emulsion. 67.5 ml of a pretreated gas oil from a Southwestern processor and 7.5 ml of tap water were blended into each tube, shaken for 30 minutes then set in a water bath at 140°-145° F. to aid in resolving the emulsion.

Into each test tube was added an emulsion breaker at one of 4 dosage levels consisting of either a quaternary alkyl amine ethoxylate composition of the present invention or two conventionally used, commercially available emulsion breakers. Readings were taken at various times, as indicated below in Table I to reflect the amount of water removed from the emulsion by the various treatments. The mean water drop for each treatment per dosage is shown in FIG. 1 (i.e., dose response).

The quaternary alkyl amine ethoxylate treatment tested (Example 1) was a 2:1 (by actives) blend of a C-18 methyl quaternary amine having 15 moles EO and a quaternary tallow amine ethoxylate, having 3 moles EO. Comparative Example A is a conventional demulsifier, characterized as a nonylphenolic resin ethoxylate (available from Nalco as 5547), and Comparative Example B is another conventional amine ethoxylate demulsifier (available from Hoechst as DV-2423).

TABLE I

| | | Water Drop Readings (water removed from emulsion in mls) 32 Time in Minutes | | | | | | |
|---|---|---|---|---|---|---|---|---|
| Treatment | ppm* | 2 | 4 | 8 | 15 | 30 | 60 | 120 |
| Example 1 | 9 | .30 | .40 | 1.0 | 3.0 | 5.0 | 6.5 | 7.0 |
| Comparative A | 9 | .40 | .40 | .40 | .40 | 1.0 | 2.0 | 4.0 |
| Comparative B | 9 | .30 | .30 | .30 | .30 | .50 | .50 | 1.5 |
| Example 1 | 12 | 1.2 | 2.5 | 4.0 | 5.0 | 6.0 | 7.0 | 7.2 |
| Comparative A | 12 | .30 | .30 | .50 | 2.0 | 4.5 | 5.0 | 6.5 |
| Comparative B | 12 | .10 | .20 | .20 | .50 | 1.5 | 2.5 | 4.0 |
| Example 1 | 18 | 1.7 | 3.0 | 4.5 | 6.0 | 7.0 | 7.2 | 7.2 |
| Comparative A | 18 | .50 | 1.5 | 2.0 | 2.5 | 4.5 | 5.5 | 6.5 |
| Comparative B | 18 | .70 | 1.0 | 2.0 | 3.5 | 5.0 | 6.5 | 7.0 |
| Example 1 | 24 | 2.0 | 3.5 | 5.0 | 6.0 | 7.0 | 7.5 | 7.5 |
| Comparative A | 24 | 1.0 | 1.5 | 2.0 | 3.0 | 4.5 | 6.5 | 7.0 |
| Comparative | 24 | 1.5 | 2.5 | 4.0 | 5.5 | 6.5 | 7.0 | 7.2 |

TABLE I-continued

| | | Water Drop Readings (water removed from emulsion in mls) Time in Minutes | | | | | | |
|---|---|---|---|---|---|---|---|---|
| Treatment | ppm* | 2 | 4 | 8 | 15 | 30 | 60 | 120 |
| tive B | | | | | | | | |

*based on equal, 30% actives products.

As indicated above the quaternary alkyl amine ethoxylates according to the present invention yield superior results as demulsifiers when compared against equal concentrations of conventional demulsifiers.

While this invention has been described with respect to particular embodiments thereof, it is apparent that numerous other forms and modifications will be obvious from this disclosure to these skilled in the art. The appended claims and this invention generally should be construed to cover all such obvious forms and modifications which are within the true spirit and scope of the present invention.

What I claim is:

1. A method for breaking a water-in-oil emulsion in a hydrocarbon liquid comprising adding to the hydrocarbon liquid from 1 to 1000 ppm. by volume, of a quaternary alkyl amine ethoxylate selected from the group consisting of a methyl quaternary amine having the structure $RN[(EO)_xH]_2CH_3$, wherein EO is ethylene oxide, x is such that the EO content is 50–70% by weight and R is a $C_{12}-C_{18}$ alkyl, and an ethoxyl quaternary amine having the structure $RN[EOH]_3$ or $RN(EOH)_2(CH_2)_3(EOH)_3$, wherein EO is ethylene oxide the EO content is 30–50% by weight and R is a $C_{12}-C_{18}$ alkyl.

2. The method of claim 1 wherein the hydrocarbon liquid is a crude oil.

3. The method of claim 1 wherein the hydrocarbon liquid is a gas oil.

4. A composition comprising a quaternary amine ethoxylate, a hydrocarbon liquid and water wherein the quaternary alkyl amine ethoxylate is selected from the group consisting of a methyl quaternary amine having the structure $RN[(EO)_xH]_2CH_3$, wherein EO is ethylene oxide, x is such that the EO content is 50–70% by weight and R is $C_{12}-C_{18}$ alkyl, and an ethoxyl quaternary amine having the structure $RN(EOH)_3$ or $RN(EOH)_2(CH_2)_3N(EOH)_3$ wherein EO is ethylene oxide, the EO content is 30–50% by weight and R is a $C_{12}-C_{18}$ alkyl.

5. The composition of claim 4 wherein about 1 to 1000 ppm, by volume, of the quaternary alkyl amine ethoxylate is present in the hydrocarbon liquid and water.

6. The composition of claim 4 wherein the hydrocarbon liquid is a crude oil.

7. The composition of claim 4 wherein the hydrocarbon liquid is a gas oil.

8. A method for breaking a water-in-oil emulsion in a hydrocarbon liquid comprising adding to the hydrocarbon liquid from 1 to 1000 ppm, by volume, of a quaternary amine oxide having the structure $RN(EOH)_2O$, wherein EO is ethylene oxide, the EO content is 20–30% by weight and R is a $C_{12}-C_{18}$ alkyl.

9. A composition comprising a quaternary amine oxide, a hydrocarbon liquid and water wherein the quaternary amine oxide has the structure $RN(EOH)_2O$, EO is ethylene oxide, the EO content is 20–30% by weight and R is a $C_{12}-C_{18}$ alkyl.

10. The composition of claim 9 wherein about 1 to 1000 ppm, by volume, of the quaternary amine oxide is present in the hydrocarbon liquid and water.

* * * * *